United States Patent [19]

Dale

[11] Patent Number: 5,281,080
[45] Date of Patent: Jan. 25, 1994

[54] PULP SLAB STACKER

[75] Inventor: Alan M. Dale, Widewater, Canada

[73] Assignee: Slave Lake Pulp Corporation, Calgary, Canada

[21] Appl. No.: 912,538

[22] Filed: Jul. 13, 1992

[51] Int. Cl.$^5$ .......................................... B65G 59/02
[52] U.S. Cl. ............................. 414/788.4; 414/786; 414/795.2; 414/796.9
[58] Field of Search ............... 414/788.4, 791.1, 794.9, 414/795.2, 796.9

[56] References Cited

U.S. PATENT DOCUMENTS

| | | | |
|---|---|---|---|
| 2,699,264 | 1/1955 | Bruce et al. | 214/6 |
| 2,948,382 | 8/1960 | Russell | 198/35 |
| 2,956,700 | 10/1960 | Quayle | 214/655 |
| 2,958,433 | 11/1960 | Borthen et al. | 414/788.4 |
| 3,037,645 | 6/1962 | Simpkins | 214/6 |
| 3,055,514 | 9/1962 | Dale et al. | 214/6 |
| 3,325,021 | 6/1967 | Burns et al. | 214/6 |
| 3,770,150 | 11/1973 | Clark | 214/89 |
| 3,828,944 | 8/1974 | Turchaninov et al. | 214/6.5 |
| 4,042,125 | 8/1977 | Falkinger et al. | 214/6 BA |
| 4,212,579 | 7/1980 | Stromberg | 414/789.9 |
| 4,331,320 | 5/1982 | Naruse et al. | 254/2 R |
| 4,439,093 | 3/1984 | Victorino | 414/786 |
| 4,641,271 | 2/1987 | Konishi et al. | 364/478 |
| 4,871,057 | 10/1989 | Aarts | 198/346.1 |

FOREIGN PATENT DOCUMENTS 205146 12/1983 German Democratic Rep. ............... 414/795.2

Primary Examiner—Michael S. Huppert
Assistant Examiner—Gregory A. Morse
Attorney, Agent, or Firm—Townsend and Townsend Khourie and Crew

[57] ABSTRACT

A method of restacking pulp slabs from a slab press allows smaller stacks to be conveyed on to a bale press without reducing the production rate of the slab press. A first stack having a predetermined number of slabs is conveyed to a transfer station, a top slab from the first stack is clamped and raised and the first stack with the remaining slabs is conveyed on for further pressing and packaging, a second stack of slabs is conveyed to the transfer station, the top slab from the first stack is lowered onto the second stack and then the top slab from the first stack and the top slab from the second stack are raised together, the second stack with the remaining slabs are conveyed on for further pressing and packaging, and then the top slab from the first stack and the top slab from the second stack are lowered to form a third stack which is conveyed on for further pressing and packaging.

8 Claims, 1 Drawing Sheet

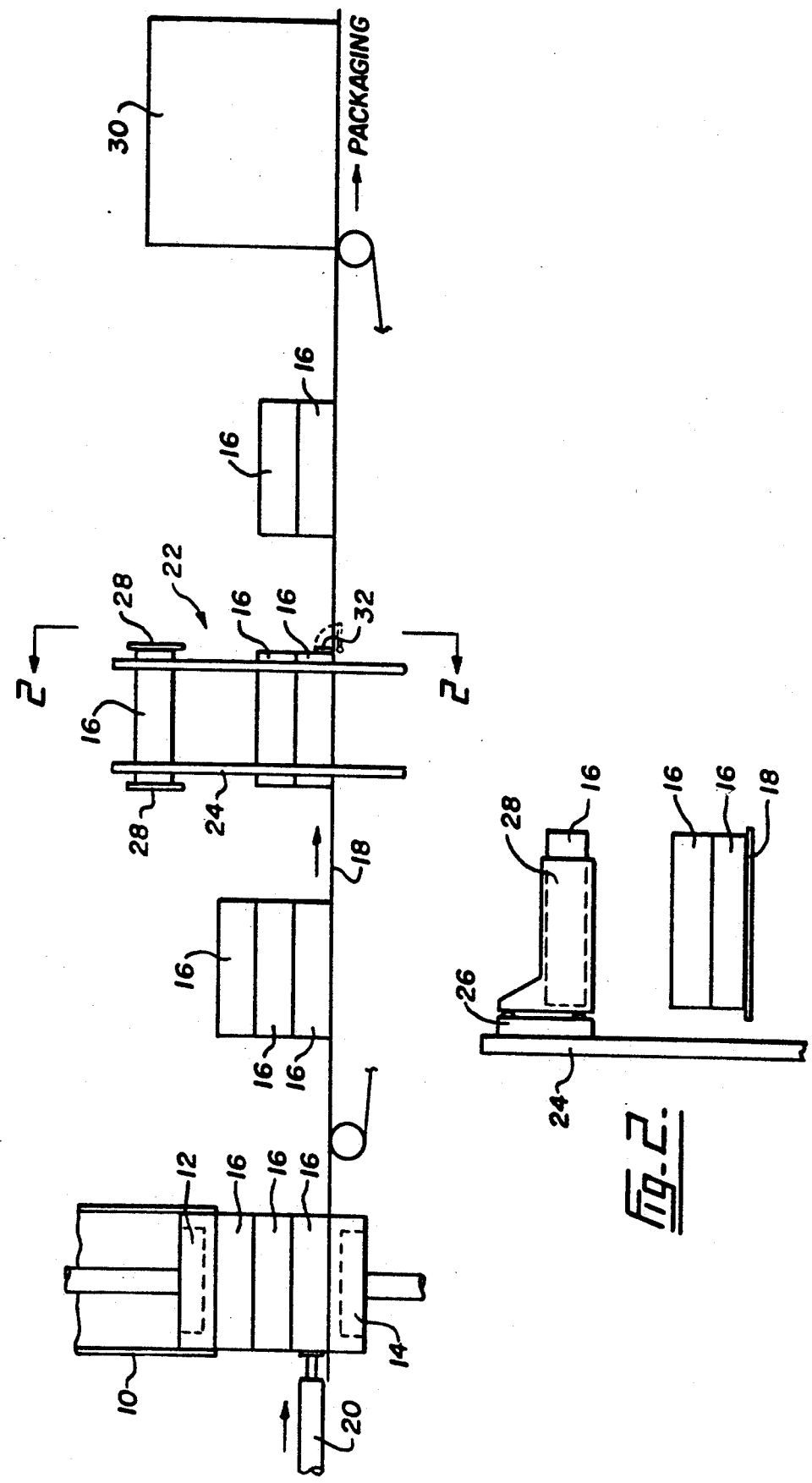

PULP SLAB STACKER

TECHNICAL FIELD

The present invention relates to the production of pulp slabs and more specifically to an improved arrangement for reducing the number of pulp slabs in a bale without reducing the overall production rate of pulp.

BACKGROUND ART

In a pulp mill, fluffed, flash dried pulp is compressed into slabs in a slab press. Several slabs are compressed one on top of another and then discharged in a stack of slabs which are further compressed and then packaged to form a bale for shipment. A stack of slabs, generally at least three slabs, is discharged from a slab press and deposited onto a conveyor. The stack of three slabs is then conveyed to a bale press, which compresses all three slabs in the stack together to form a bale. The bale is then packaged for shipment.

A typical slab from a slab press weighs approximately 250 kilograms and 600 mm by 800 mm with varying heights. The cycle time to make an individual slab in a slab press results in a low production rate, therefore the slab press forms as many large slabs as possible, one on top of the other, before discharging because the step of discharging a stack of slabs onto a conveyor causes a delay in the production of slabs. For this reason, three or even four slabs are produced in one cycle in order to maximize the production rate. However, when a stack of three or four slabs are placed on a conveyor the height of the stack is often greater than is desired for packaging into a bale, or greater than required by customers, and therefore it is necessary to remove one or more slabs from the top of the stack and combine the removed slabs with other slabs so that stacks of slabs passing to a bale press have fewer slabs than the stack of slabs exiting from the slab press.

Whereas one could produce less slabs in a stack leaving a slab press, this would decrease the production rate of slabs and can cause a bottleneck in the production of pulp. For instance, if one was to produce only two slabs of identical height instead of three slabs of the same height per stack from a slab press, then the time to discharge a stack with only two slabs results in a production rate loss as high as 20%.

DISCLOSURE OF INVENTION

It is an aim of the present invention to provide a method wherein a stack of slabs being conveyed on a conveyor to a bale press may have at least one slab removed from the top of the stack and then combined with one or more slabs from further stacks so that the stack of slabs entering the bale press has fewer slabs than the stack of slabs exiting from the slab press.

It is a further aim of the present invention to provide equipment to lift at least one slab from a stack of slabs and hold that slab while the reduced slab stack is further conveyed to a bale press, and then when another stack of slabs is conveyed from the slab press, to lower the held slab onto the top of the new stack of slabs and lift at least two slabs together from the second stack. The two slabs being held are then lowered onto the conveyor so that the stacks conveyed to the bale press all have only two slabs.

The present invention provides in a process for packaging pulp slabs into bales wherein pulp slabs are formed in a slab press and leave the press stacked a predetermined number of slabs high, the improvement of providing a bale containing fewer slabs than the number of slabs in a stack leaving the slab press, comprising the steps of: conveying a first stack having a predetermined number of slabs to a transfer station, clamping and lifting at least one slab from the top of the first stack at the transfer station, conveying the first stack with the remaining slabs for further pressing and packaging into a bale, conveying a second stack having the predetermined number of slabs to the transfer station, lowering the at least one slab from the top of the first stack onto the top of the second stack at the transfer station, clamping and lifting the at least one slab from the top of the first stack with at least one slab from the top of the second stack, conveying the second stack with the remaining slabs for further pressing and packaging into a bale, lowering the at least one slab from the top of the first stack, and the at least one slab from the top of the second stack together onto the transfer station to form a third stack, and conveying the third stack for further pressing and packaging into a bale.

In a further embodiment there is provided in an apparatus for packaging pulp slabs into bales including a slab press that delivers a stack having a predetermined number of slabs, the improvement of an apparatus for providing a stack containing fewer slabs then the stack having a predetermined number of slabs delivered from the slab press, comprising: conveying means for conveying stacks of bales from the slab press, transfer station on the conveying means, clamping and lifting means at the transfer station for clamping and lifting at least one slab from a top of a stack, control means for conveying a first stack having a predetermined number of slabs on the conveying means to the transfer station, clamping and lifting at least one slab from the top of the first stack with the clamping and lifting means, conveying the first stack with the remaining slabs on the conveying means for further processing into a bale, conveying a second stack having the predetermined number of slabs on the conveying means to the transfer station, lowering the at least one slab from the top of the first stack onto the top of the second stack with the clamping and lifting means, clamping and lifting the at least one slab from the top of the first stack with at least one slab from the top of the second stack with the clamping and lifting means, conveying the second stack with the remaining slabs on the conveying means for further processing into a bale, lowering the at least one slab from the top of the first stack and the at least one slab from the top of the second stack together onto the conveying means at the transfer station with the clamping and lifting means to form a third stack, and conveying the third stack on the conveying means for further processing into a bale.

BRIEF DESCRIPTION OF DRAWINGS

In drawings which illustrate embodiments of the invention,

FIG. 1 is a schematic layout view showing one embodiment of a pulp slab stacker according to the present invention.

FIG. 2 is a sectional view taken at line 2—2 of FIG. 1.

BEST MODE FOR CARRYING OUT THE INVENTION

Referring now to the drawings, a slab press 10 is shown in FIG. 1 which has a top ram 12 and a bottom ram 14. The rams are operated by hydraulic cylinders (not shown). Three slabs 16 are shown stacked in the slab press 10 and the bottom ram 14 is positioned in line with a conveyor 18 for conveying a stack of slabs 16. Each slab 16 is formed in the slab press, flash dried pulp is fed into the press mold which, when full is then compressed between the top ram 12 and the bottom ram 14. When the first slab 16 is formed, the rams 12,14 are opened, the press mold is filled again with pulp and a second slab formed on top of the first slab. The third slab is formed on top of the first two slabs. When the stack of three bales 16 is lowered on the bottom ram 14 to its full extent, the top bale 16 is below the bottom edge of the press mold 10 and a transfer plunger from cylinder 20 shown on the left of the lowest slab 16 pushes the stack of bales 16 onto the conveyor 18.

A transfer station 22 or stacker station is shown on the conveyor 18 and has a forklift mast 24 comprising two uprights in which a carriage moves up and down. As shown in FIG. 2, the carriage 26 has two side clamps 28 with mechanical or hydraulic mechanisms for opening horizontally and then closing in order to grip a slab 16.

When a three slab stack reaches the transfer station 22, the conveyor 18 stops the stack. A removable stop 32 is shown adjacent the conveyor 18 to ensure the stacks always stop at the same position. The removable stop 32 folds down when the stack is conveyed away on the conveyor 18. The carriage 26 with the clamps 28 open is lowered, the clamps are closed to clamp the top slab 16 and the carriage 26 raises the top slab 16 above the stack. The two slab stack at the transfer station 22 then proceeds on the conveyor 18 and passes into a bale press 30 for further compression into a bale after which the bale is packaged for shipment.

In operation a three slab stack moves from the slab press 10 to the transfer station 22. The side clamps 28 pick up the top slab 16 and raise it above the existing stack. The removable stop 32 is lowered after the top slab has been raised and the two slab stack then continues on the conveyor 18 to the bale press 30.

The next three slab stack from the slab press 10 then enters the transfer station 22 and is positioned by the removable stop 32. The carriage 26 moves down on the uprights so that the slab 16 from the first stack is lowered and positioned on the second stack, making the second stack a total of four slabs high. The side clamps 28 move apart, releasing the slab, and the carriage 26 then moves further down, the clamps 28 then move together to clamp the second slab which is the top slab of the second stack entering the transfer station 22. The carriage 26 then lifts the top two slabs, the removable stop 32 is lowered and the conveyor 18 moves the two slab stack away from the transfer station 22 and towards the bale press 30. The carriage 26 then lowers the two slabs held by the clamps 28 down onto the conveyor 18, the clamps 28 are released and the carriage 26 moves upwards leaving a two slab stack at the transfer station 22. The conveyor 18 then moves the two slab stack towards the bale press.

This process continues for three slab stacks coming from the slab press so that only two slab stacks enter the bale press.

Whereas three slab stacks are shown and described herein, it will be apparent that in certain instances four slab stacks may be produced by a slab press in which case two slabs could be picked off each stack by the clamps 28 and the carriage 26. In another embodiment four slab stacks may be transferred on the conveyor and one slab may be picked from each stack assembling them together so that three slab stacks continue to the bale press.

By utilizing the stacker arrangement of the present invention, one is able to produce the maximum number of slabs in the slab press before lowering the bottom ram 14 and pushing the stack of slabs from the slab press onto the conveyor 18. The larger the slabs that can be made in the press before having to lower the ram 14 to its lowest position, then the higher the production rate of the slab press. In general, the size of slabs that can be produced on the slab press are dependent upon the space left between the top of the conveyor 18 and the underside of the slab press mold 10.

The operation of the conveyor hydraulic clamps 28 and carriage 26 are preferably by computer. Limit switches are provided to position the carriage and the clamps. Thus, if there is a change in the size of the slabs or the number of the slabs, this can be done by simply rearranging the position of the limit switches. The timing of the conveyor movement is also controlled to ensure that when a stack is conveyed to the bale press 30 the previous stack has left the bale press and has proceeded to the packaging stage. The operation of the carriage 26 and the clamps 28 are preferably hydraulic cylinders consistent with the operation of similar equipment in the slab press and bale press line.

Various changes may be made to the embodiments shown herein without departing from the scope of the present invention which is limited only by the following claims.

The embodiments of the present invention in which an exclusive property or privilege is claimed are defined as follows:

1. In a process for packaging pulp slabs into bales wherein the pulp slabs are formed in a slab press and leave the press stacked a predetermined number of slabs high, the improvement of providing a bale containing a number of slabs which is smaller than the predetermined number of slabs in a stack leaving the slap press, comprising the steps of:
  conveying a first stack having the predetermined number of slabs to a transfer station;
  lifting at lest one slab from the top of the first stack at the transfer station so that the first stack has a number of slabs, the number being greater than zero;
  conveying the first stack having the number of slabs for further pressing and packaging into a bale;
  conveying a second stack having the predetermined number of slabs to the transfer station;
  lowering the at lest one slab from the top of the first stack onto the top of the second stack at the transfer station;
  lifting the at least one slab from the top of the first stack with at least one slab from the top of the second stack so that the second stack has said number of slabs;
  conveying the second stack having said number of slabs for further pressing and packaging into a bale;
  lowering the at least one slab from the top of the first stack, and the at least one slab from the top of the second stack together onto the transfer station to form a third stack; and conveying the third stack for further pressing and packaging into a bale.

2. The process for packaging pulp slabs according to claim 1 wherein the stacks are brought to a stop at the transfer station.

3. The process for packaging pulp slabs according to claim 1 wherein the lifting steps include clamping the slabs and the lowering steps include unclamping the slabs.

4. In a process for packaging pulp slabs into bales wherein pulp slabs are formed in a slab press and leave the press in stacks three slabs high, the improvement of providing two slab stacks from three slab stacks comprising the steps of:

conveying a first stack having three slabs to stop at a transfer station;

clamping and lifting a top slab to leave the first stack having two slabs;

conveying the first stack having two slabs for further pressing and packaging into a two slab bale;

conveying a second stack having three slabs to stop at the transfer station;

lowering the top slab from the first stack onto the second stack;

lifting the top slab from the second stack together with the top slab from the first stack to leave the second stack having two bales;

conveying the second stack having two slabs for further pressing and packaging into a two slab bale;

lowering the top slab from the second stack and the top slab from the first stack together onto the transfer station to form a third stack having two slabs; and conveying the third stack having two slabs for further pressing and packaging into a two slab bale.

5. In an apparatus for packaging pulp slabs into bales including a slab press that delivers a stack having a predetermined number of slabs, the improvement of an apparatus for providing a stack containing a number of slabs the number being less than the predetermined number of slabs delivered from the slab press, comprising:

means for conveying stacks of bales from the slab press;

a transfer station on the conveying means;

clamping and lifting means at the transfer station for clamping and lifting at least one slab from a top of a stack; and control means for conveying a first stack having a predetermined number of slabs on the conveying means to the transfer station, clamping and lifting at least one slab from the top of the first stack with the clamping and lifting means so that the first stack has the number of slabs, conveying the first stack having the number of slabs on the conveying means for further processing into a bale, conveying a second stack having the predetermined number of slabs on the conveying means to the transfer station, lowering the at least one slab from the top of the first stack onto the top of the second stack with the clamping and lifting means, clamping and lifting the at least one slab from the top of the first stack with at least one slab from the top of the second stack with the clamping and lifting means so that the second stack has the number of slabs, conveying the second stack having the number of slabs on the conveying means for further processing into a bale, lowering the at least one slab from the top of the first stack and the at least one slab from the top of the second stack together onto the conveying means at the transfer station with the clamping and lifting means to form a third stack, and conveying the third stack on the conveying means for further processing into a bale.

6. The apparatus for packaging pulp slabs according to claim 5 including stack stop means at the transfer station for stopping each stack of slabs stops in the same position at the transfer station.

7. The apparatus for packaging pulp slabs according to claim 5 wherein the clamping and lifting means comprises side flanges adapted to move horizontally apart and together, the side flanges being adapted to grip at least one slab and wherein the side flanges are supported by a carriage having raising and lowering means.

8. In a process for packaging pulp slabs into bales wherein the pulp slabs are formed in a slab press and leave the press stacked and predetermined number of slabs high, the improvement of providing a bale containing a number of slabs which is smaller than the predetermined number of slabs in a stack leaving the slab press, comprising the steps of:

conveying a first stack having the predetermined number of slabs to a transfer station;

lifting at least one slab from the top of the first stack at the transfer station so that the first stack has a number of slabs, the number being greater than zero;

conveying the first stack having said number of slabs for pressing and packaging into a bale;

conveying a second stack having the predetermined number of slabs to the transfer station;

lowering the at least one slab from the top of the first stack onto the top of the second stack at the transfer station;

lifting the at least one slab from the top of the first stack with at least one slab from the top of the second stack so that the second stack has said number of slabs; and conveying the second stack having said number of slabs for further pressing and packaging into a bale.

* * * * *